United States Patent Office 2,857,390
Patented Oct. 21, 1958

2,857,390

MONO-QUATERNARY AMMONIUM SALTS OF BIS-TERTIARY-AMINOALKYL AMIDES OF ALKANEDIOIC ACIDS

Frederick K. Kirchner, Albany, N. Y., assignor to Sterling Drug Inc., New York, N. Y., a corporation of Delaware No Drawing. Application November 2, 1955
Serial No. 544,601

21 Claims. (Cl. 260—294)

This invention relates to quaternary ammonium compounds and more particularly is concerned with an improvement in quaternary ammonium salts of bis-amides of alkanedioic acids.

Bis-quaternary ammonium salts of symmetrical bis-tertiary-amino-alkyl amides of alkanedioic acids are known. However, neither the mono-quaternary ammonium salts of a symmetrical bis-amide nor the mono-quaternary ammonium salts of the unsymmetrical bis-amides are known. The known methods for preparing bis-quaternary ammonium salts of the symmetrical bis-amides above are not practical for the preparation of quaternaries other than bis-quaternaries, even though the amount of quaternizing agent, et cetera, be varied in an attempt to produce them, and the necessary unsymmetrical bis-amide intermediates have not been suggested by the art.

Accordingly, it is among the objects of the present invention to provide a procedure whereby the mono-quaternary ammonium salts of both the symmetrical and unsymmetrical bis-amides of the type above-named can be prepared.

A further object of the invention is to provide a novel group of mono-quaternary ammonium compounds, possessing unexpectedly superior effectiveness for certain physiological uses as hereinafter described.

The general method for the preparation of the mono-quaternary ammonium salts of the above-named bis-amides includes reacting a quaternary ammonium salt of an N-(tertiary-amino-lower-alkyl) amide of a carbo-lower-alkoxy substituted lower alkanoic acid with an N-(tertiary-amino-lower-alkyl) primary amine. The required N-(tertiary-amino-lower-alkyl) amide intermediates are prepared by reacting an N-(tertiary-amino-lower-alkyl) primary alkylamine with a di-lower-alkyl alkane dicarboxylate, followed by quaternization with an ester of a strong inorganic acid or organic sulfonic acid.

A particular aspect of the invention relates to mono-quaternary ammonium salts of compounds having the Formula I

wherein R is a member of the group consisting of saturated hydrocarbon radicals having from one to about ten carbon atoms, or such radicals substituted by a tertiary-amino group, $n$ is a number from 0 to about 6, A is a lower-alkylene radical, and B=N is a member of the group consisting of di-lower-alkylamino, 1-piperidyl, 1-pyrrolidyl and 4-morpholinyl radicals, and in which the quaternization involves the nitrogen atom of B=N.

The group R in the above general Formula I is a saturated hydrocarbon having from one to about ten carbon atoms, and thus can be methyl, ethyl, propyl, isopropyl, butyl, isobutyl, pentyl, heptyl, hexyl, octyl, nonyl, decyl and cycloalkyl or substituted cycloalkyl derivatives such as cyclopentyl, cyclohexyl, 2-methylcyclopentyl, 3-methylcyclohexyl, 4-ethylcyclohexyl, cycloheptyl and the like or such saturated hydrocarbon radicals substituted by an aliphatic tertiary-amino group. Preferred compounds are those wherein the group R is lower-alkyl, di-lower-alkyl-amino-lower-alkyl, (1-piperidyl)-lower-alkyl, (1-pyrrolidyl)-lower-alkyl, (4-morpholinyl)-lower-alkyl or 3-tropyl. The term lower-alkyl includes alkyl radicals containing from 1 to about 6 carbon atoms, and in the di-lower-alkylamino radicals the lower-alkyl groups can be the same or different. Thus the lower-alkylamino radicals can be dimethylamino, ethylmethylamino, diethylamino, dipropylamino, di-isopropylamino, dibutylamino, di-isobutylamino, dipentylamino, di-isopentylamino and dihexylamino.

The grouping $C_nH_{2n}$, where $n$ is a number from 1 to about 6, represents a lower-alkylene bridge between the carbonyl groups. When $n=0$ there are no carbon atoms intervening between the carbonyl groups which in this case are joined directly. The compounds wherein $n=0$ are of particular value since it has been discovered that such compounds possess a high anticholinesterase activity. The $n$ of the $C_nH_{2n}$ grouping varies from 0 to about 6 and includes derivatives of oxalic acid, malonic acid, succinic acid, glutaric acid, adipic acid, pimelic acid, suberic acid and branched chain isomers thereof.

The divalent radical A represents a lower-alkylene radical in which the free valences are on different carbon atoms. In other words the amide nitrogen and the tertiary-amino nitrogen are attached to different carbon atoms of A. The radical A must perforce contain at least two carbon atoms, and can contain as many as about five carbon atoms. The lower-alkylene radicals are straight or branched and include such radicals as ethylene, —CH$_2$CH$_2$—; 1,3-propylene, —CH$_2$CH$_2$CH$_2$—; 1,2-propylene, —CH(CH$_3$)CH$_2$—; 1,4-butylene,

—CH$_2$CH$_2$CH$_2$CH$_2$—

1,5-pentylene, —CH$_2$CH$_2$CH$_2$CH$_2$CH$_2$—; 1,2-dimethyl-ethylene, —CH(CH$_3$)CH(CH$_3$)—, and the like.

The tertiary-amino groups of the compounds of the invention are basic aliphatic type tertiary-amino groups in which the nitrogen is attached to saturated aliphatic groups such as lower alkyl and cycloalkyl. Such basic aliphatic tertiary-amino groups also include saturated heterocyclic groups such as piperidyl, pyrrolidyl, morpholinyl and the like as distinguished from heterocyclic groups containing conjugate unsaturation such as pyridine, pyrrole and the like.

In a preferred class of the invention the tertiary-amino radical B=N of Formula I includes di-lower-alkylamino and saturated heterocyclic groups, such as 1-piperidyl, 1-pyrrolidyl, 4-morpholinyl, and lower-alkylated derivatives thereof. The term lower-alkyl has the meaning given above.

The compounds of the invention are quaternized on the nitrogen atom of B=N by the addition of an ester of a strong inorganic acid or an organic sulfonic acid. A preferred group of quaternizing agents are those having the formula R'X wherein R' is a member of the class consisting of lower-alkyl, lower-alkenyl and monocarbocyclic aryl-lower-alkyl and X is an anion. The group R', when lower-alkyl or lower-alkenyl can be straight or branched and can contain from 1 to about 6 carbon atoms, thus including such radicals as methyl, ethyl, propyl, isopropyl, allyl, butyl, isobutyl, butenyl, pentenyl, isopentenyl and the like. The term monocarbocyclic aryl-lower-alkyl includes members of the benzene series, containing from 7 to about 12 carbon atoms, and can be an unsubstituted phenyl group or a phenyl group substituted by one or more substituents inert to the reaction conditions and reagents used in the process for preparing the compounds. Such inert substituents include lower-alkyl, lower-alkoxy, halogen, nitro and trifluoromethyl groups. A preferred class of monocarbocyclic aryl-lower-alkyl groups consists of phenyl-lower-alkyl groups and phenyl-lower-alkyl groups in which the benzene ring is substituted with from 1 to 3 lower-alkyl, nitro, halogen or lower-alkoxy groups. Furthermore, said substituents can be in any of the available positions of the phenyl nucleus, and where more than one, can be the same or different and can be in any of the various position combinations relative to each other. The lower-alkyl portion of the monocarbocyclic aryl-lower-alkyl radical includes methylene, —$CH_2$—; ethylene, —$CH_2CH_2$—; 1,3-propylene, —$CH_2CH_2CH_2$—; 1,2-propylene,

—$CH(CH_3)CH_2$— and the like. When the benzene ring of the phenyl-lower-alkyl groups is substituted with halogen atoms, these atoms can be any of the four halogens, fluorine, chlorine, bromine or iodine. The lower-alkyl and lower-alkoxyl groups preferably have from 1 to about 4 carbon atoms and thus can be methyl, ethyl, propyl, isopropyl, butyl, methoxy, ethoxy, propoxy, isopropoxy, butoxy, isobutoxy, etc. The term lower-alkoxy is also intended to include the methylenedioxy group, —$OCH_2O$—.

The nature of the anion X, provided it is relatively non-toxic, is immaterial since the physiological activity resides in the cationic part of the molecule. Preferred compounds are those in which X is halogen selected from the group chlorine, bromine or iodine since these are derived from readily available starting materials.

Specific examples of the group R'X include methyl chloride, methyl bromide, methyl iodide, ethyl bromide, propyl chloride, allyl chloride, allyl bromide, tertiary-butyl chloride, benzyl chloride, 2-nitrobenzyl chloride, 3-nitrobenzyl bromide, 3,5-dinitrobenzyl chloride, 4-chlorobenzyl bromide, 2-bromobenzyl chloride, 2-chlorobenzyl chloride, 2-iodobenzyl chloride, 3,4-dichlorobenzyl chloride, 2-methoxybenzyl chloride, 4-methoxybenzyl bromide, 2,5-dimethoxybenzyl bromide, 3-ethoxybenzyl chloride, 4-ethoxybenzyl bromide, 4-propoxybenzyl bromide, 2-butoxybenzyl chloride, 3-nitro-4-methoxybenzyl chloride, 2-nitrophenethyl chloride, 3-nitrophenethyl bromide, 4-chlorophenethyl chloride, 3-bromophenethyl chloride, 2-methoxyphenethyl bromide, 2,5-dimethoxyphenethyl bromide, phenylpropyl chloride, 2-chlorophenylisopropyl bromide and 3,4-dimethoxyphenylpropyl bromide.

The quaternary ammonium salts of Formula I, when R is di-lower-alkylamino-lower-alkyl, (1-piperidyl)-lower-alkyl, (1-pyrrolidyl)-lower-alkyl and (4-morpholinyl)-lower-alkyl, have a tertiary-amino group and hence can be used in the form of crystalline, water-soluble acid-addition salts, the anions of which are non-toxic to the animal organisms in therapeutic doses of the salts, and these salts are also within the purview of the invention. Appropriate acid-addition salts are those derived from mineral acids such as hydrochloric acid, hydrobromic acid, hydriodic acid, nitric acid, phosphoric acid and sulfuric acid, and organic acids such as acetic acid, citric acid, tartaric acid, lactic acid and the like, giving the hydrochloride, hydrobromide, hydriodide, nitrate, phosphate or acid phosphate, sulfate or bisulfate, acetate, citrate, tartrate or bitartrate, and lactate salts, respectively.

The quaternary ammonium salts of an N-(tertiary-amino-lower-alkyl)-N'-saturated hydrocarbon substituted or an N-(tertiary-amino-lower-alkyl)-N'-(tertiary-amino-saturated hydrocarbyl) alkanedioic acid bis-amide are prepared by reacting a quaternary ammonium salt of an N-(tertiary-amino-lower-alkyl)-amide of a carbo-lower-alkoxy substituted lower alkanoic acid with an alkyl primary amine or an N-(tertiary-amino-lower-alkyl) primary amine, respectively. Compounds of Formula I are prepared from the quaternary ammonium salts of compounds having the general Formula II

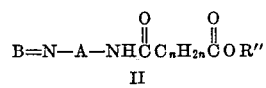
II wherein R″ is a lower-alkyl group containing from 1 to about 6 carbon atoms which can be in a straight or a branched chain, and n, A and B=N have the meanings given above, by reacting with a compound $RNH_2$ wherein R has the meaning given above. Preferred conditions for the reaction involve heating the reactants at a temperature between about 50° C. and 150° C. optionally in an anhydrous solvent inert under the conditions of the reaction.

The quaternary ammonium salts of compounds of Formula II are prepared by reacting a free base of Formula II with a compound R'X wherein R' and X have the meanings given above. The reaction is preferably carried out at a temperature between about 50° C. to 100° C. and in the presence of an anhydrous solvent, for example, acetonitrile, which is inert under the conditions of the reaction. A preferred class of quaternary ammonium salts of compounds of Formula II are quaternary ammonium salts of compounds having the Formula III

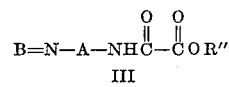
III wherein R″, A and B=N have the meanings given above, and are prepared by reacting a free base of Formula III with a compound R'X wherein R' and X have the meanings given above, preferably at a temperature of between about 50° C. and 100° C. in the presence of a solvent inert under the conditions of the reaction.

The N-(tertiary-amino-lower-alkyl) amides of a carbo-lower-alkoxy substituted lower alkanoic acid of Formula II are prepared by reacting an N-(tertiary-amino-lower-alkyl) primary alkylamine with a di-lower-alkyl alkanedi-carboxylate. The preferred class of compounds having Formula III are prepared by reacting about one molar equivalent of an amine, having the formula

B=N—A—$NH_2$ where B=N and A have the meanings given above, with about two molar equivalents of a di-lower-alkyl oxalate in a solvent, such as ethanol, which is inert under the conditions of the reaction. The components react when mixed at room temperature. The compounds of Formulas II and III described hereinabove are claimed in my co-pending application Serial No. 692,016, filed Sept. 26, 1957.

Pharmacological evaluation of the compounds of Formulas I and II and their quaternary ammonium salts has established that these substances possess curare antagonizing properties which indicates their usefulness in anesthesiology for counteracting the effects of d-tubocurarine and in the treatment of myesthenia gravis. The compounds have also been found to possess anti-cholinesterase activity similar to that of neostigmine. Compounds of Formula II are also useful for the preparation of compounds of Formula I.

The following examples will further illustrate the invention without limiting the invention thereto.

*Example 1*

(a) Ethyl N-(2-dimethylaminoethyl)oxamate [III, R″ is $C_2H_5$, A is —$CH_2CH_2$—, B=N is $(CH_3)_2N$]

A mixture of 153 g. of diethyl oxalate and 300 ml. of absolute alcohol was placed in a 1 liter three-necked flask equipped with a mechanical stirrer, reflux condenser and dropping funnel. Dimethylaminoethylamine (44 g.) was added over a period of one-half an hour, during which time the mixture became warm. Stirring was continued for two hours then the mixture was left standing overnight at room temperature. The alcohol solution was concentrated and the residue distilled giving 60 g. of ethyl N-(2-dimethylaminoethyl)oxamate, B. P. 126–130° C. (1.0 mm.).

(b) Ethyl N-[2-(2 - chlorobenzyldimethylammonio)-ethyl]oxamate chloride [II, R'' is $C_2H_5$, $n$ is 0, A is —$CH_2CH_2$—, B=N is $(CH_3)_2N$; 2-$ClC_6H_4CH_2Cl$ salt]

A mixture of 36 g. of ethyl N-(2-dimethylaminoethyl)oxamate and 39 g. of 2-chlorobenzyl chloride in 100 ml. of dry acetonitrile was refluxed for 18 hours. The solution was concentrated and ether was added to precipitate a white solid which was filtered then purified by recrystallization from alcohol-ether, giving, after drying in a vacuum desiccator over $P_2O_5$, 60 g. of ethyl N-[2-(2 - chlorobenzyldimethylammonio)ethyl]oxamate chloride, M. P. 145.5° C.

Analysis.—Calcd. for $C_{15}H_{22}Cl_2N_2O_3$: N, 8.02; $Cl_{ionic}$, 10.15. Found: N, 8.05; $Cl_{ionic}$, 9.99.

(c) N-[2-(2 - chlorobenzyldimethylammonio)ethyl-N'-(2-diethylaminoethyl)oxamide chloride [I, R is $$CH_2CH_2N(C_2H_5)_2$$

$n$ is 0, A is —$CH_2CH_2$—, B=N is $(CH_3)_2N$;

2-$ClC_6H_4CH_2Cl$ salt]

A mixture of 17.5 g. of ethyl N-[2-(2-chlorobenzyldimethylammonio)ethyl]oxamate chloride and 100 ml. of absolute alcohol was treated with 11.6 g. of β-diethylaminoethylamine and the mixture refluxed for 18 hours. The alcohol solution was concentrated and the residue diluted with ether whereupon a gum separated. The gum was dissolved in ethanol, caused to oil out again by the addition of ether, and finally triturated with ether, giving a crystalline material which was filtered and dried over phosphorus pentoxide in a vacuum desiccator at 0.5 mm., giving 13 g. of N-[2-(2-chlorobenzyldimethylammonio)ethyl] - N' - 2-diethylaminoethyl)oxamide chloride, M. P. 92–94° C.

*Example 2*

(a) Ethyl N-(2-diethylaminoethyl)oxamate [III, R'' is $C_2H_5$, A is —$CH_2CH_2$—, B=N is $(C_2H_5)_2N$]

Diethyl oxalate (306 g.) was placed in a 1 liter three-neck flask fitted with a mechanical stirrer, condenser and dropping funnel. To this was added with stirring 116 g. of β-diethylaminoethylamine over a period of one-half an hour. Stirring of the warm solution was continued for two hours then the mixture was left standing overnight. Distillation through a 6'' Vigreux column gave 175 g. of ethyl N-(2-diethylaminoethyl)oxamate, B. P. 112–122° C./1 mm., $n_D^{25}$ 1.4595.

Analysis.—Calcd for $C_{10}H_{20}N_2O_3$: $N_{total}$, 12.95; $N_{basic}$, 6.47. Found: $N_{total}$, 12.66; $N_{basic}$, 6.32.

The anticholinesterase activity of ethyl N-(2-diethylaminoethyl)oxamate, as measured by the electrometric method for the determination of red blood cell and plasma cholinesterase activity [Michel, J. Lab. Clin. Med., 34, 1564 (1949)], was found to be 6.4% that of neostigmine.

(b) Ethyl N-[2-(2-chlorobenzyldiethylammonio)ethyl]-oxamate chloride [II, R'' is $C_2H_5$, $n$ is 0, A is —$CH_2CH_2$—, B=N is $(C_2H_5)_2N$; 2-$C_6H_4CH_2Cl$ salt]

A mixture of 21.6 g. of ethyl N-(2-diethylaminoethyl)-oxamate, 20 g. of 2-chlorobenzyl chloride and 25 ml. of dry acetonitrile was refluxed for twenty hours. The solution was cooled, reduced to about one-third the original volume by boiling off acetonitrile then diluted with ether whereupon a white crystalline material separated. The solid was collected by filtration then disolved in ethanol, reprecipitated with ether, filtered and dried over phosphorus pentoxide in a vacuum desiccator at 0.5 mm. to give 26 g. of ethyl N-[2-(2-chlorobenzyldiethylammonio)ethyl]oxamate chloride, M. P. 88.5° C.

Analysis.—Calcd. for $C_{17}H_{27}Cl_2N_2O_3$: N, 7.40; $Cl_{ionic}$, 9.37. Found: N, 7.35; $Cl_{ionic}$, 9.00.

(c) N - [2-(2-chlorobenzyldiethylammonio)ethyl]-N'-(2-diethylaminoethyl)oxamide chloride [I, R is

—$CH_2CH_2N(C_2H_5)_2$, $n$ is 0, A is —$CH_2CH_2$—, B=N is $(C_2H_5)_2N$; 2-$ClC_6H_4CH_2Cl$ salt]

A solution of 50 g. of ethyl N-[2-(2-chlorobenzyldiethylammonio)ethyl]oxamate chloride and 31 g. of β-diethylaminoethylamine in 200 ml. of ethanol was refluxed for 17 hours. Most of the solvent was evaporated and the residue poured into ether to precipitate white crystals which were collected by filtration and purified by reprecipitation with alcohol-ether. After filtration and drying in a vacuum oven at 65° C./1 mm. there was obtained 41 g. of N-[2-(2-chlorobenzyldiethylammonio)-ethyl]-N'-(2-diethylaminoethyl)oxamide chloride, M. P. 134° C.

Analysis.—Calcd. for $C_{21}H_{36}Cl_2N_4O_2$: N, 12.52; $Cl_{ionic}$, 7.92;. Found: N, 12.43; $Cl_{ionic}$, 8.15.

N-[2-(2-chlorobenzyldiethylammonio)ethyl]-N'-(2-diethylaminoethyl)oxamide chloride was found to be an effective antagonist of d-tubocurarine paralysis in the cat and dog. A dose of 40 micrograms per kilogram of the compound caused 100% antagonism of the muscle relaxing action of d-tubocurarine on the cat sciatic nerve-gastrocnemius muscle. In a similar way, 50 micrograms per kilogram caused 68% antagonism on the dog sciatic nerve-gastrocnemius muscle. Premedication of mice with this compound in a dose of 10 micrograms per kilogram afforded protection to 38% of the mice against a paralyzing dose of 0.44 microgram per kilogram of d-tubocurarine. The N-[2-(2 - chlorobenzyldiethylammonio)ethyl]-N' - (2 - diethylaminoethyl)oxamide chloride was found to have an anticholinesterase activity of 26% of that of neostigmine as measured by the method of Michel (loc. cit.).

(d) N-[2-(2-chlorobenzyldiethylammonio)ethyl]-N'-(2-diethylaminoethyl)oxamide chloride bisulfate [part (c) above; $H_2SO_4$ salt] was prepared by dissolving 400 g. of N-[2-(2-chlorobenzyldiethylammonio)ethyl]-N'-(2-diethylaminoethyl)oxamide chloride (part (c) of example) in 500 ml. ethanol, followed by addition, with cooling, of 48 ml. of concentrated sulfuric acid in 400 ml. of ethanol. The N-[2 - (2 - chlorobenzyldiethylammonio)-ethyl]-N'-(2-diethylaminoethyl)oxamide chloride bisulfate that precipitated was filtered, washed with isopropanol and dried at 70° C., giving 305 g., M. P. 179–182° C.

Analysis.—Calcd. for $C_{21}H_{36}Cl_2N_4O_2 \cdot H_2SO_4$: $Cl_{ionic}$, 650; $SO_{4ionic}$, 17.62. Found: $Cl_{ionic}$, 6.62; $SO_{4ionic}$, 17.40.

*Example 3*

(a) Ethyl N-[2-(1-piperidyl)ethyl]oxamate [III, R'' is $C_2H_5$, A is —$CH_2CH_2$—, B=N is 1-piperidyl] was prepared from 61.3 g. of diethyl oxalate and 25.6 g. of β-piperidylethylamine in 125 ml. of ethanol according to the method described in Example 1, part (a) for the preparation of ethyl N-(2-dimethylaminoethyl)oxamate. The 27 g. of ethyl N-[2-(1-piperidyl)ethyl]oxamate thus obtained had the B. P. 168–169° C. (1.5 mm.).

(b) Ethyl N-[2-(2-chlorobenzylpentamethyleneammonio)ethyl]oxamate chloride [II, R'' is $C_2H_5$, $n$ is 0, A is —$CH_2CH_2$—, B=N is 1-piperidyl; 2-$ClC_6H_4CH_2Cl$ salt] was prepared from 35 g. of ethyl N-[2-(1-piperidyl)ethyl]-oxamate and 35 g. of 2-chlorobenzyl chloride in 200 ml. of acetonitrile according to the method described in Example 1, part (b) for the preparation of ethyl N-[2-(2 - chlorobenzyldimethylammonio)ethyl]oxamte chloride. After three reprecipitations from alcohol-ether there was obtained 27 g. of ethyl N-[2-(2-chlorobenzylpentamethyleneammonio)ethyl]oxamate chloride, M. P. 130° C.

Analysis.—Calcd. for $C_{18}H_{26}Cl_2N_2O_3$: N, 7.22; $Cl_{ionic}$, 9.10. Found: N, 7.07; $Cl_{ionic}$, 8.99.

(c) N-[2-(2-chlorobenzylpentamethyleneammonio)-ethyl]-N'-(2-diethylaminoethyl)oxamide chloride [I, R is —CH$_2$CH$_2$N(C$_2$H$_5$)$_2$, n is 0, A is —CH$_2$CH$_2$—, B=N is 1-piperidyl; 2-ClC$_6$H$_4$CH$_2$Cl salt] was prepared from 19.5 g. of ethyl N-[2-(2-chlorobenzylpentamethyleneammonio)ethyl]oxamate chloride and 11.6 g. of β-diethylaminoethylamine in 100 ml. alcohol according to the method described in Example 1, part (c) for the preparation of N-[2-(2-chlorobenzyldimethylammonio)ethyl]-N'-(2-diethylaminoethyl)oxamide chloride. There was thus obtained 12.7 g. of N-[2-(2-chlorobenzylpentamethyleneammonio)ethyl]-N'-(2-diethylaminoethyl)oxamide chloride, M. P. 110.5° C.

Analysis.—Calcd. for C$_{22}$H$_{36}$Cl$_2$N$_4$O$_2$: Cl$_{ionic}$, 7.82; N, 12.19. Found: Cl$_{ionic}$, 7.91; N, 12.27.

Example 4

(a) Ethyl N-[3-diethylamino)propyl]oxamate [III, R" is C$_2$H$_5$, A is —CH$_2$CH$_2$CH$_2$—, B=N is (C$_2$H$_5$)$_2$N] was prepared from 153 g. of diethyl oxalate and 65 g. of 3-diethylaminopropylamine in 500 ml. of ethanol according to the method described in Example 1, part (a) for the preparation of N-[2-(2-chlorobenzyldimethylammonio)ethyl]oxamate. There was thus obtained 92.3 g. of ethyl N-[3-(diethylamino)propyl]oxamate, B. P. 110–111° C./0.25 mm.; $n_D^{25}$ 1.4622.

Analysis.—Calcd. for C$_{11}$H$_{22}$N$_2$O$_3$: C, 57.36; H, 9.63; N, 12.17. Found: C, 56.94; H, 9.66; N, 12.40.

(b) Ethyl N-[3-(2-chlorobenzyldiethylammonio)propyl]oxamate chloride [II, R" is C$_2$H$_5$, n is 0, A is —CH$_2$CH$_2$CH$_2$—, B=N is (C$_2$H$_5$)$_2$N; 2-ClC$_6$H$_4$CH$_2$Cl salt] was prepared from 23 g. of ethyl N-[3-(diethylamino)propyl]oxamate and 17 g. of 2-chlorobenzyl chloride in 100 ml. of acetonitrile according to the method described in Example 1, part (b) for the preparation of ethyl N-[2-(2-chlorobenzyldiethylammonio)ethyl]oxamate chloride. There was thus obtained 23.1 g. of ethyl N-[3-(2-chlorobenzyldiethylammonio)propyl]oxamate chloride, M. P. 127° C.

Analysis.—Calcd. for C$_{16}$H$_{26}$Cl$_2$N$_2$O$_3$: Cl$_{ionic}$, 9.06; N, 7.16. Found: Cl$_{ionic}$, 8.86; N, 7.23.

(c) N-[3-(2-chlorobenzyldiethylammonio)propyl]-N'-[3-(1-piperidyl)propyl]oxamide chloride [I, R is —CH$_2$CH$_2$CH$_2$(1-piperidyl), n is 0, A is

—CH$_2$CH$_2$CH$_2$—

B=N is (C$_2$H$_5$)$_2$N; 2-ClC$_6$H$_4$CH$_2$Cl salt] was prepared from 15 g. of ethyl N-[3-(2-chlorobenzyldiethylammonio)propyl]oxamate chloride and 10.8 g. of 1-(3-aminopropyl)piperidine in 75 ml. of ethanol according to the method described in Example 1, part (c) for the preparation of N-[2-(2-chlorobenzyldimethylammonio)ethyl]-N'-(2-diethylaminoethyl)oxamide chloride. The 14.6 g. of N-[3-(2-chlorobenzyldiethylammonio)propyl]-N'-[3-(1-piperidyl)propyl]oxamide chloride thus obtained had the M. P. 141.5° C.

Analysis.—Calcd. for C$_{24}$H$_{40}$Cl$_2$N$_4$O$_2$: Cl$_{ionic}$, 7.27; N, 11.49. Found: Cl$_{ionic}$, 7.62; N, 11.32.

Example 5

(a) Ethyl N-(n-propyl)oxamate was prepared from 306 g. of diethyl oxalate and 50 g. of n-propylamine in 300 ml. of ethanol according to the method described in Example 1, part (a) for the preparation of ethyl N-(2-dimethylaminoethyl)oxamate. The 123 g. of ethyl N-(n-propyl)oxamate thus obtained had the B. P. 106–107° C./1.6 mm.

Analysis.—Calcd. for C$_7$H$_{13}$NO$_3$: C, 52.81; H, 8.23; N, 8.80. Found: C, 52.87; H, 8.68; N, 8.85.

(b) N-(2-diethylaminoethyl)-N'-(n-propyl)oxamide was prepared from 79.5 g. of ethyl N-(n-propyl)oxamate and 116 g. of β-diethylaminoethylamine in 250 ml. of ethanol according to the method described in Example 1, part (c) for the preparation of N-[2-(2-chlorobenzyldimethylammonio)ethyl]-N'-(2-diethylaminoethyl)oxamide chloride. There was thus obtained 112 g. of N-(2-diethylaminoethyl)-N'-(n-propyl)oxamide, M. P. 64–67° C.

Analysis.—Calcd. for C$_{11}$H$_{23}$N$_3$O$_2$: C, 57.61; H, 10.10; N, 18.32. Found: C, 57.85; H, 10.37; N, 17.96.

(c) N-[2-(2-chlorobenzyldiethylammonio)ethyl]-N'-(n-propyl)oxamide chloride [III, R" is —CH$_2$CH$_2$CH$_3$, n is 0, A is —CH$_2$CH$_2$—, B=N is (C$_2$H$_5$)$_2$N;

2-ClC$_6$H$_4$CH$_2$Cl salt] was prepared from 30 g. of N-(2-diethylaminoethyl)-N'-(n-propyl)oxamide and 25 g. of 2-chlorobenzyl chloride in 100 ml. of acetonitrile according to the method used in Example 1, part (b) for the preparation of ethyl N-[2-(2-chlorobenzyldimethylammonio)ethyl]oxamate chloride. The 20 g. of N-[2-(2-chlorobenzyldiethylammonio)ethyl]-N'-(n-propyl)oxamide chloride thus obtained had the M. P. 96° C.

Analysis.—Calcd. for C$_{18}$H$_{29}$Cl$_2$N$_3$O$_2$: N, 10.77; Cl$_{ionic}$, 9.08. Found: N, 10.75; Cl$_{ionic}$, 8.98.

The anticholinesterase activity of N-[2-(2-chlorobenzyldiethylammonio)ethyl]-N'-(n-propyl)oxamide chloride as measured by the method of Michel (loc. cit.) was found to be 6.6% that of neostigmine.

Example 6

N-[2-(2-chlorobenzyldiethylammonio)ethyl]-N'-(2-dimethylaminoethyl)oxamide chloride [I, R is

—CH$_2$CH$_2$N(CH$_3$)$_2$ n is 0, A is —CH$_2$CH$_2$—, B=N is (C$_2$H$_5$)$_2$N;

2-ClC$_6$H$_4$CH$_2$Cl salt]

A solution of 35 g. of ethyl N-[2-(2-chlorobenzyldiethylammonio)ethyl]oxamate chloride [prepared as described in Example 2, part (b)] and 15 g. of β-dimethylaminoethylamine in 100 ml. of ethanol was refluxed for fifteen hours. The solvent was removed and the residue poured into ether to precipitate a gummy solid which was induced to crystallize by trituration with ether. The very hygroscopic crystals were collected by filtration and dried in a vacuum desiccator at 0.5 mm. over phosphorus pentoxide giving 25 g. of N-[2-(2-chlorobenzyldiethylammonio)ethyl-N'-(2-dimethylaminoethyl)oxamide chloride, M. P. 78–80° C.

Example 7

N-[2-(2-chlorobenzyldiethylammonio)ethyl]-N'-[2-(1-piperidyl)ethyl]oxamide chloride [I, R is —CH$_2$CH$_2$(1-piperidyl), n is 0, A is —CH$_2$CH$_2$—, B=N is (C$_2$H$_5$)$_2$N; 2-ClC$_6$H$_4$CH$_2$Cl salt] was prepared from 22.5 g. of ethyl N-[2-(2-chlorobenzyldiethylammonio)-ethyl]oxamate chloride [prepared as described in Example 2, part (b)] and 15.4 g. of 2-(1-piperidyl)ethylamine in 100 ml. of ethanol according to the method described in Example 2, part (c), for the preparation of N-[2-(2-chlorobenzyldiethylammonio)ethyl]-N'-(2-diethylaminoethyl)oxamide chloride. After three recrystallizations from alcohol-ether there was obtained 16.2 g. of N-[2-(2-chlorobenzyldiethylammonio)ethyl]-N'-[2-(1-piperidyl)ethyl]oxamide chloride, M. P. 158.5° C.

Analysis.—Calcd. for C$_{22}$H$_{37}$Cl$_2$N$_4$O$_2$: N, 12.16; Cl, 15.40. Found: N, 12.11; Cl, 15.52.

The anticholinesterase activity of N-[2-(2-chlorobenzyldiethylammonio)ethyl]-N'-[2-(1-piperidyl)ethyl]oxamide chloride as measured by the method of Michel (loc. cit.) was found to be 5.8% that of neostigmine.

Example 8

N-[2-(2-chlorobenzyldiethylammonio)ethyl]-N'-(3-diethylaminopropyl)oxamide chloride [I, R is

—CH$_2$CH$_2$CH$_2$N(C$_2$H$_5$)$_2$ $n$ is 0, A is —CH$_2$CH$_2$—, B=N is (C$_2$H$_5$)$_2$N;
2-ClC$_6$H$_4$CH$_2$Cl salt] was prepared from 20 g. of ethyl N-[2-(2-chlorobenzyldiethylammonio)ethyl]oxamate chloride [prepared as described in Example 2, part (b)] and 14 g. of 3-diethylaminopropylamine in 100 ml. of ethanol according to the method described in Example 2, part (c) for the preparation of N - [2 - (2 - chlorobenzyldiethylammonio) ethyl]-N'-(2-diethylaminoethyl)oxamide chloride. The 14 g. of N-[2-(2-chlorobenzyldiethylammonio)ethyl]-N'-(3-diethylaminopropyl)oxamide chloride thus obtained had the M. P. 142.5° C.

*Analysis.*—Calcd. for C$_{22}$H$_{38}$Cl$_2$N$_4$O$_2$: N, 12.14; Cl$_{ionic}$, 7.68. Found: N, 12.24; Cl$_{ionic}$, 7.88.

The anticholinesterase activity of N-[2-(2-chlorobenzyldiethylammonio)ethyl] - N' - [3 - (diethylamino)propyl] oxamide chloride as measured by the method of Michel (loc. cit.) was found to be 6.2% that of neostigmine.

*Example 9*

N-[2-(2-chlorobenzyldiethylammonio)ethyl] - N' - (3 - tropyl)oxamide chloride [I, R is 3-tropyl, $n$ is 0, A is —CH$_2$CH$_2$—, B=N is (C$_2$H$_5$)$_2$N; 2-ClC$_6$H$_4$CH$_2$Cl salt] was prepared from 25 g. of ethyl N-[2-(2-chlorobenzyldiethylammonio)ethyl]oxamate chloride [prepared as described in Example 2, part (b)] and 18.5 g. of 3-tropylamine in 125 ml. of ethanol according to the method described in Example 2, part (c) for the preparation of N-[2-(2-chlorobenzyldiethylammonio)ethyl]-N' - (2 - di - ethylaminoethyl)oxamide chloride. There was thus obtained 14 g. of N-[2-(2-chlorobenzyldiethylammonio)ethyl]-N'-(3-tropyl)oxamide chloride, M. P. 160° C.

*Analysis.*—Calcd. for C$_{23}$H$_{36}$Cl$_2$N$_4$O$_2$: N, 11.88; Cl$_{ionic}$, 7.54. Found: N, 11.98; Cl$_{ionic}$, 7.68.

The anticholinesterase activity of N-[2-(2-chlorobenzylammonio)ethyl]-N'-(3-tropyl)oxamide chloride as measured by the method of Michel (loc. cit.) was found to be 12% that of neostigmine.

*Example 10*

(a) Ethyl N-[2-(benzyldiethylammonio)ethyl]oxamate chloride [II, R" is C$_2$H$_5$, A is —CH$_2$CH$_2$—, B=N is (C$_2$H$_5$)$_2$N; C$_6$H$_5$CH$_2$Cl salt] was prepared from 20 g. of ethyl N-(2-diethylaminoethyl)oxamate [prepared as described in Example 2, part (a)] and 15 g. of benzyl chloride in 100 ml. of acetonitrile according to the method described for the preparation of ethyl N-[2-(2-chlorobenzyldiethylammonio)ethyl]oxamate chloride. The 27 g. of ethyl N-[2-(benzyldiethylammonio)ethyl]oxamate chloride thus obtained had the M. P. 145° C.

*Analysis.*—Calcd. for C$_{17}$H$_{27}$ClN$_2$O$_3$: N, 8.17; Cl$_{ionic}$, 10.34. Found: N, 8.13; Cl$_{ionic}$, 10.14.

(b) N-[2-(benzyldiethylammonio)ethyl] - N' - (2 - diethylaminoethyl)oxamide chloride [I, R is

—CH$_2$CH$_2$N(C$_2$H$_5$)$_2$

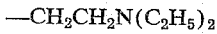

$n$ is 0, A is —CH$_2$CH$_2$—, B=N is (C$_2$H$_5$)$_2$N; C$_6$H$_5$CH$_2$Cl salt] was prepared from 15 g. of ethyl N-[2-benzyldiethylammonio)ethyl]oxamate chloride and 10.2 g. of β-diethylaminoethylamine in 100 ml. of ethanol according to the method described in Example 2, part (c) for the preparation of N-[2-(2-chlorobenzyldiethylammonio)ethyl]-N'-(2-diethylaminoethyl)oxamide chloride. There was thus obtained 9 g. of N-[2-(benzyldiethylammonio)ethyl]-N'-(2-diethylaminoethyl)oxamide chloride, M. P. 156.5° C.

*Analysis.*—Calcd. for C$_{21}$H$_{37}$ClN$_4$O$_2$: N, 13.57; Cl$_{ionic}$, 8.58. Found: N, 13.67; Cl$_{ionic}$, 8.77.

*Example 11*

(a) Ethyl N-[2 - (2 - methoxybenzyldiethylammonio) ethyl]oxamate chloride [II, R" is C$_2$H$_5$, $n$ is 0, A is —CH$_2$CH$_2$—, B=N is (C$_2$H$_5$)$_2$N; 2-CH$_3$OC$_6$H$_4$CH$_2$Cl salt] was prepared from 30 g. of ethyl N-(2-diethylaminoethyl)oxamate [prepared as described in Example 2, part (a)] and 31 g. of 2-methoxybenzyl chloride in 100 ml. of acetonitrile according to the method described in Example 2, part (b) for the preparation of ethyl N-[2-(2-chlorobenzyldiethylammonio)ethyl]oxamate chloride. There was thus obtained 48 g. of ethyl N-[2-(2-methoxybenzyldiethylammonio)ethyl]oxamate chloride, M. P. 106.5° C.

*Analysis.*—Calcd. for C$_{18}$H$_{29}$ClN$_2$O$_4$: Cl$_{ionic}$, 9.51; N, 7.51. Found: Cl$_{ionic}$, 9.23; N, 7.42.

(b) N-[2 - (2 - methoxybenzyldiethylammonio)ethyl]-N'-(2-diethylaminoethyl)oxamide chloride [I, R is

—CH$_2$CH$_2$N(C$_2$H$_5$)$_2$

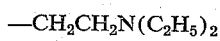

$n$ is 0, A is —CH$_2$CH$_2$—, B=N is (C$_2$H$_5$)N; 2-CH$_3$OC$_6$H$_4$CH$_2$Cl salt] was prepared from 48 g. of ethyl N-[2-(2-methoxybenzyldiethylammonio)ethyl]oxamate chloride and 30 g. of β-diethylaminoethylamine in 200 ml. of ethanol according to the procedure described in Example 2, part (c) for the preparation of N-[2-(2-chlorobenzyldiethylammonio)ethyl]-N'-(2-diethylaminoethyl)oxamide chloride. The product was collected by filtration and recrystallized from isopropanol to give 42 g. of N-[2-(2-methoxybenzyldiethylammonio)ethyl] - N' - (2 - diethylaminoethyl)oxamide chloride, M. P. 151° C.

*Analysis.*—Calcd. for C$_{22}$H$_{39}$ClN$_4$O$_3$: Cl$_{ionic}$, 8.00; N, 12.65. Found: Cl$_{ionic}$, 8.22; N, 12.76.

*Example 12*

(a) Ethyl N-[2-(3,4-dichlorobenzyldiethylammonio) ethyl]oxamate chloride [II, R" is C$_2$H$_5$, $n$ is 0, A is —CH$_2$CH$_2$—, B=N is (C$_2$H$_5$)$_2$N; 3,4-Cl$_2$C$_6$H$_3$CH$_2$Cl salt] was prepared from 30 g. of ethyl N-(2-diethylaminoethyl)oxamate [prepared as described in Example 2, part (a)] and 39 g. of 3,4-dichlorobenzyl chloride in 100 ml. of acetonitrile according to the manipulative procedure described in Example 2, part (b). There was thus obtained 54 g. of ethyl N-[2-(3,4-dichlorobenzyldiethylammonio)ethyl]oxamate chloride, M. P. 160.5° C.

*Analysis.*—Calcd. for C$_{17}$H$_{25}$Cl$_3$N$_2$O$_3$: Cl$_{ionic}$, 8.61; N, 6.80. Found: Cl$_{ionic}$, 8.47; N. 6.87.

(b) N-[2-(3,4-dichlorobenzyldiethylammonio)ethyl]-N'-(2-diethylaminoethyl)oxamide chloride [I, R is

—CH$_2$CH$_2$N(C$_2$H$_5$)$_2$

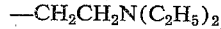

$n$ is 0, A is —CH$_2$CH$_2$—, B=N is (C$_2$H$_5$)$_2$N; 3,4-Cl$_2$C$_6$H$_3$CH$_2$Cl salt] was prepared from 35 g. of ethyl N-[2-(3,4-dichlorobenzyldiethylammonio)ethyl]oxamate chloride and 20 g. of β-diethylaminoethylamine in 175 ml. of ethanol according to the method described in Example 2, part (c). The N-[2-3,4-dichlorobenzyldiethylammonio)ethyl]-N'-(2-diethylaminoethyl)oxamide chloride thus obtained weighed 21.5 g. and had the M. P. 159–161° C.

*Analysis.*—Calcd. for C$_{21}$H$_{35}$Cl$_3$N$_4$O$_2$: Cl$_{ionic}$, 7.36; N, 11.47. Found: Cl$_{ionic}$, 7.49; N. 11.63.

*Example 13*

Ethyl N-[2-(4 - nitrobenzyldiethylammonio)ethyl]oxamate chloride [II, R" is C$_2$H$_5$, $n$ is 0, A is —CH$_2$CH$_2$—, B=N is (C$_2$H$_5$)$_2$N; 4-O$_2$NC$_6$H$_4$CH$_2$Cl salt] was prepared from 21.6 g. of ethyl N-(2-diethylaminoethyl)oxamate and 22 g. of 4-nitrobenzyl chloride in 100 ml. of acetonitrile according to the method described in Example 2, part (b). The 29 g. of ethyl N-[2-(4-nitrobenzyldiethylammonio)ethyl]oxamate chloride thus obtained had the M. P. 124° C.

*Analysis.*—Calcd. for C$_{17}$H$_{26}$ClN$_3$O$_5$: N, 10.84; Cl$_{ionic}$, 9.08. Found: N, 10.71; Cl$_{ionic}$, 9.22.

*Example 14*

(a) Ethyl N-(2-diethylaminoethyl)adipamate [II, R" is C$_2$H$_5$, $n$ is 4, A is —CH$_2$CH$_2$—, B=N is (C$_2$H$_5$)$_2$N] A solution of 212 g. of diethyl adipate and 58 g. of β-diethylaminoethylamine was heated to 130° C. for four hours then left standing for twelve hours. The alcohol formed in the reaction was removed at reduced pressure and the residue distilled through a six inch Vigreaux column to give 88 g. of ethyl N-(2-diethylaminoethyl) adipamate, B. P. 167–170° C./0.5 mm. $n_D^{25}$ 1.4638.

Analysis.—Calcd. for $C_{14}H_{28}N_2O_3$: N, 10.28. Found: N, 10.01.

(b) Ethyl N-[2-(2-chlorobenzyldiethylammonio)ethyl] adipamate chloride [II, R'' is $C_2H_5$, n is 4, A is

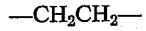

B=N is $(C_2H_5)_2N$; $2\text{-}ClC_6H_4CH_2Cl$ salt] was prepared from 50 g. of ethyl N-(2-diethylaminoethyl)adipamate and 32 g. of 2-chlorobenzyl chloride in 200 ml. of acetonitrile according to the method described in Example 2, part (b). The 56 g. of ethyl N-[2-(2-chlorobenzyldiethylammonio)ethyl]adipamate chloride thus obtained had the M. P. 104.4° C.

Analysis.—Calcd. for $C_{21}H_{34}Cl_2N_2O_3$: $Cl_{ionic}$, 8.18; N, 6.46. Found: $Cl_{ionic}$, 8.25; N, 6.59.

(c) N - [2 - (2 - chlorobenzyldiethylammonio)ethyl] - N'-[2-(diethylaminoethyl)adipamide chloride [I, R is —$CH_2CH_2N(C_2H_5)_2$, n is 4, A is —$CH_2CH_2$—, B=N is $(C_2H_5)_2N$; $2\text{-}ClC_6H_4CH_2Cl$ salt] can be prepared from ethyl N - [2 - (2-chlorobenzyldiethylammonio)ethyl]adipamate and β-diethylaminoethylamine according to the procedure described in Example 2, part (c).

Example 15

N - [2 - (2,4-dichlorobenzyldiethylammonio)ethyl]-N'-[2-(diethylamino)ethyl]oxamide chloride [I, R is

—$CH_2CH_2N(C_2H_5)_2$ n is 0, A is —$CH_2CH_2$—, B=N is $(C_2H_5)_2N$; $2,4\text{-}Cl_2C_6H_3CH_2Cl$ salt] can be prepared from ethyl N-[2-(2,4-dichlorobenzyldiethylammonio)ethyl]oxamate chloride and 2-diethylaminoethylamine according to the method described in Example 2, part (c). The product thus obtained has the M. P. 137° C.

Analysis.—Calcd. for $C_{21}H_{35}Cl_3N_4O_2$: $Cl_{ionic}$, 7.36; N, 11.63. Found: $Cl_{ionic}$, 7.72; N, 11.44.

Example 16

N-[3 - (2-chlorobenzyldiethylammonio)propyl]-N'-(3-tropyl)oxamide chloride [I, R is 3-tropyl, n is 0, A is —$CH_2CH_2CH_2$—, B=N is $(C_2H_5)_2N$; $2\text{-}ClC_6H_3CH_2Cl$ salt] can be prepared from ethyl N-[3-(2-chlorobenzyldiethylammonio)propyl]oxamate chloride [prepared as described in Example 4, part (b)] and 3-tropylamine according to the method described in Example 2, part (c) for the preparation of N-[2-(2-chlorobenzyldiethylammonio)ethyl]-N'-(2-diethylaminoethyl)oxamide chloride. There was thus obtained 16 g. of N-[3-(2-chlorobenzyldiethylammonio)propyl]-N'-(3-tropyl)oxamide chloride, M. P. softens at 146° C. (indef.) (corr.).

Analysis.—Calcd. for $C_{24}H_{38}Cl_2N_4O_2$: N, 11.54; $Cl_{ionic}$, 7.31. Found: N, 11.21; $Cl_{ionic}$, 7.51.

N-[2-(4-nitrobenzyldiethylammonio)ethyl]-N' - [2-(1-pyrrolidyl)ethyl]oxamide chloride [I, R is (1-pyrrolidyl)ethyl, n is 0, A is —$CH_2CH_2$—, B=N is $(C_2H_5)_2N$; $4\text{-}O_2NC_6H_4CH_2Br$ salt] can be prepared from ethyl N-[2-(4-nitrobenzyldiethylammonio)ethyl]oxamate chloride (Example 13) and 2-(1-pyrrolidyl)ethyl amine according to the method described in Example 2, part (c).

N - [2 - (4 -methylbenzyltetramethyleneammonio)propyl]-N'-(n-octyl)oxamide chloride [I, R is n-$C_8H_{17}$, n is 0, A is —$CH_2CH_2CH_2$—, B=N is (1-pyrrolidyl); $4\text{-}CH_3C_6H_4CH_2Cl$ salt] can be prepared from ethyl N - [2 - (4 - methylbenzyltetramethyleneammonio)propyl]oxamate chloride and n-octyl amine according to the method described in Example 2, part (c). The intermediate oxamate chloride can be prepared from ethyl N-[3-(1-pyrrolidyl)propyl]oxamate (prepared from diethyl oxalate and 3-(1-pyrrolidyl)propyl amine) as described in Example 2, part (a) and 4-methylbenzyl chloride according to the procedure described in Example 2, part (b).

N - [2 -(4-bromobenzyldiethyleneoxyammonio)ethyl]-N'-(2-diethylaminoethyl)oxamide bromide [I, R is —$CH_2CH_2N(C_2H_5)_2$, n is 0, A is—$CH_2CH_2$—, B=N is (4-morpholinyl); $4\text{-}BrC_6H_4CH_2Br$ salt] can be prepared from ethyl N-[2-(4-bromobenzyldiethyleneoxyammonio)ethyl]oxamate bromide and 2-diethylaminoethylamine according to the method described in Example 2, part (c). The intermediate oxamate bromide can be prepared from 2-(4-morpholinyl)ethyl amine and diethyl oxalate, followed by quaternization with 4-bromobenzyl chloride according to the methods described in Example 2, parts (a) and (b), respectively.

N - [2 - (3 - methoxybenzyldiethylammonio)ethyl]-N' - (1 - methyl - 4 - diethylaminobutyl)suberamide chloride [I, R is —$CH(CH_3)CH_2CH_2CH_2N(C_2H_5)_2$, n is 6, A is —$CH_2CH_2$—, B=N is $(C_2H_5)_2N$;

$3\text{-}CH_3OC_6H_4CH_2Cl$ salt]

can be prepared from ethyl N-[3-methoxybenzyldiethylammonio)ethyl]suberamate chloride and N,N-diethyl-1,4-pentanediamine according to the method described in Example 2, part (c). The intermediate suberamate chloride can be prepared from ethyl N-(2-diethylamino)ethyl suberamate and 3-methoxybenzyl chloride according to the method described in Example 2, part (c). Ethyl N-(2-diethylamino)ethyl suberamate can be prepared from diethyl suberate and 2-diethylaminoethyl amine according to the method described in Example 14, part (a).

N - [2 - diethylmethylammonio)ethyl] - N' - [2 - (4-morpholinyl)ethyl]glutaramate iodide [I, R is (4-morpholinyl)ethyl, n is 3, A is —$CH_2CH_2$—, B=N is $(C_2H_5)_2N$; $CH_3I$ salt] can be prepared from methyl N-[2-(diethylmethylammonio)ethyl]glutaramate iodide and 2-(4-morpholinyl)ethyl amine according to the method described in Example 2, part (c). The intermediate glutaramate iodide can be prepared from methyl N-(2-diethylaminoethyl)glutaramate (prepared from dimethyl glutarate and 2-diethylaminoethyl amine) as described in Example 14, part (a) and methyl iodide according to the method described in Example 2, part (b).

N - [4 - diethylallylammonio)butyl] - N' - (cyclopentyl)oxamide bromide [I, R is cyclopentyl, n is 0, A is —$CH_2CH_2CH_2CH_2$—, B=N is $(C_2H_5)_2N$; $CH_2$=$CHCH_2Br$ salt] can be prepared from ethyl N-[4-(diethylallylammonio)butyl]oxamate bromide and cyclopentenyl amine according to the method described in Example 2, part (c). Ethyl N - [4 - diethylallylammonio)butyl]oxamate bromide can be prepared by quaternization of ethyl N-[4-(diethylamino)butyl]oxamate with allyl bromide. Ethyl N-[4-diethylamino)butyl]oxamate can be prepared from diethyl oxalate and 4-diethylaminobutylamine according to the method described in Example 2, part (a).

N - [3 - (t - butyldiisopropylammonio)propyl] - N'-(isopropyl)oxamide chloride] I, R is $(CH_3)_2CH$—, n is 0, A is —$CH_2CH_2CH_2$—, B=N is $[(CH_3)_2CH]_2N$; $(CH_3)_3CCl$ salt] can be prepared from ethyl N-[3-(t-butyldiisopropylammonio)propyl]oxamate chloride and isopropyl amine according to the method described in Example 2, part (c). The ethyl N-[3-(t-butyldiisopropylammonio)propyl]oxamate chloride can be prepared from ethyl N-[3-(diisopropylamino)propyl]oxamate and t-butyl chloride according to the method described in Example 2, part (b). The N-[3-diisopropylamino)propyl]oxamate can be prepared from diethyl oxalate and 3-diisopropylaminopropyl amine according to the method described in Example 2, part (a).

The non-identity of the compounds of Examples 3c and 7 and also the non-identity of Examples 1c and 6c shows that no migration of the quaternizing group has occurred during the course of preparation and thus, with the mode of preparation and the analyses, establishes the structure of these compounds.

The compounds of the foregoing examples have an action similar to neostigmine and hence may be used as skeletal muscle stimulants and as an antidote to curare. They are active at dose levels of about 0.001–1.0 mg./kg. of body weight whereas the toxicity ranges from about 3.0 mg./kg. for the more active compounds to about 400 mg./kg. of body weight for the less active compounds. The compounds, like neostigmine, can be administered orally as tablets or capsules compounded with the usual excipients, or parenterally as aqueous solutions.

I claim:

1. A mono-quaternary ammonium salt of an N-(tertiary - amino - lower - alkyl) - N' - (tertiary - amino-saturated hydrocarbyl)-lower-alkanedioic acid amide, wherein the quaternary ammonium salt involves the tertiary-amino group of the N-(tertiary-amino-lower-alkyl) group.

2. A mono-quaternary ammonium salt of an N-(tertiary - amino - lower - alkyl) - N' - saturated hydrocarbon substituted-lower-alkanedicarboxylic acid bisamide.

3. A mono-quaternary ammonium salt of a compound having the general formula

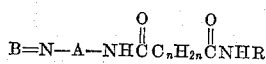

wherein R is a di-lower-alkylamino-lower-alkyl radical, $n$ is a number from 0 to 6, A is a lower alkylene radical, B=N is a di-lower-alkylamino radical and the quaternization involves the nitrogen of B=N.

4. A mono-quaternary ammonium salt of a compound having the general formula

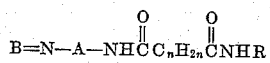

wherein R is a di-lower-alkylamino-lower-alkyl radical, $n$ is a number from 0 to 6, A is a lower alkylene radical, B=N is a 1-piperidyl radical and the quaternization involves the nitrogen atom of B=N.

5. A mono-quaternary ammonium salt of a compound having the general formula

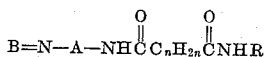

wherein R is a 2-(1-piperidyl)ethyl radical, $n$ is a number from 0 to 6, A is a lower alkylene radical, B=N is a di-lower-alkylamino radical and in which the quaternization involves the nitrogen atom of B=N.

6. A mono-quaternary ammonium salt of a compound having the general formula

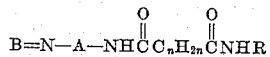

wherein R is a 3-(1-piperidyl)propyl radical, $n$ is a number from 0 to 6, A is a lower alkylene radical, B=N is a di-lower-alkylamino radical and in which the quaternization involves the nitrogen atom of B=N.

7. A mono-quaternary ammonium salt of a compound having the general formula

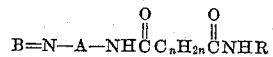

wherein R is a diethylaminoethyl radical, $n$ is 0, A is an ethylene radical, B=N is a diethylamino radical and the quaternization involves the nitrogen atom of B=N.

8. A mono-quaternary ammonium salt of a compound having the formula

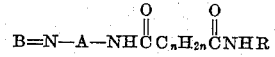

wherein R is a diethylaminoethyl radical, $n$ is 0, A is an ethylene radical, B=N is a 1-piperidyl radical and the quaternization involves the nitrogen atom of B=N.

9. A mono-quaternary ammonium salt of a compound having the formula

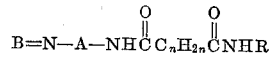

wherein R is a 2-(1-piperidyl)ethyl radical, $n$ is 0, A is an ethylene radical, B=N is a diethylamino radical and the quaternization involves the nitrogen atom of B=N.

10. A mono-quaternary ammonium salt of a compound having the general formula

wherein R is a 3-(1-piperidyl)propyl radical, $n$ is 0, A is a 1,3-propylene radical, B=N is a diethylamino radical and the quaternization involves the nitrogen atom of B=N.

11. N-[2-(2 - chlorobenzyldiethylammonio)ethyl] - N'-(2-diethylaminoethyl)oxamide chloride.

12. N-[2-(2-methoxybenzyldiethylammonio)ethyl] - N'-(2-diethylaminoethyl)oxamide chloride.

13. N - [2 - (2 - chlorobenzylpentamethyleneammonio)-ethyl]-N'-(2-diethylaminoethyl)oxamide chloride.

14. N-[2-(2 - chlorobenzyldiethylammonio)ethyl] - N'-[2-(1-piperidyl)ethyl]oxamide chloride.

15. N-[3-(2-chlorobenzyldiethylammonio)propyl] - N'-[3-(1-piperidyl)propyl]oxamide chloride.

16. A quaternary ammonium salt of a compound having the general formula

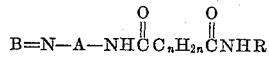

wherein R is a lower-alkyl radical, $n$ is a number from 0 to 6, A is a lower alkylene radical and B=N is a di-lower-alkylamino radical.

17. N-[2-(2 - chlorobenzyldiethylammonio)ethyl] - N'-(n-propyl)oxamide chloride.

18. The process for preparing a mono-quaternary ammonium salt of an N-(tertiary-amino-lower-alkyl)-N'-(tertiary-amino-saturated hydrocarbyl) lower-alkanedicarboxylic acid which comprises reacting a quaternary ammonium salt of an N-(tertiary-amino-lower-alkyl)-amide of a carbo-lower-alkoxy substituted lower-alkanoic acid with an N-(tertiary-amino-saturated hydrocarbyl) primary amine in an anhydrous solvent.

19. The process for preparing a quaternary ammonium salt of an N-(tertiary-amino-lower-alkyl)-N'-(saturated hydrocarbon substituted) lower-alkanedicarboxylic acid which comprises reacting a quaternary ammonium salt of an N-(tertiary-amino-lower-alkyl)amide of a carbo-lower-alkoxy substituted lower-alkanoic acid with a saturated hydrocarbon substituted primary amine in an anhydrous solvent.

20. The process for preparing a mono-quaternary ammonium salt of a compound having the formula

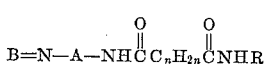

wherein R is a di-lower-alkylamino-lower-alkyl radical, $n$ is 0, A is lower-alkylene, B=N is a di-lower-alkylamino radical and in which the quaternization involves the nitrogen of B=N, which comprises reacting a quaternary ammonium salt of a compound having the formula

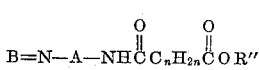

wherein R" is a lower-alkyl radical with a compound having the formula RNH₂.

21. A process for preparing a mono-quaternary ammonium salt of N-[2-(diethylamino)ethyl]-N'-[2-(diethylamino)ethyl]oxamide which comprises reacting a quaternary ammonium salt of a compound having the formula
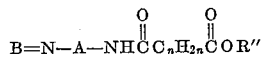
wherein R″ is an ethyl radical, $n$ is 0, A is —CH$_2$CH$_2$—, B=N is a diethylamino radical, with 2-diethylaminoethylamine in an anhydrous solvent.
References Cited in the file of this patent
UNITED STATES PATENTS
| | | |
|---|---|---|
| 2,438,200 | Behr | Mar. 23, 1948 |
| 2,561,323 | Waller | July 17, 1951 |
| 2,606,921 | Weisblat | Aug. 12, 1952 |
| 2,653,898 | Castillo | Sept. 29, 1953 |
| 2,669,582 | Cusic | Feb. 16, 1954 |

UNITED STATES PATENT OFFICE
Certificate of Correction

Patent No. 2,857,390                         October 21, 1958

Frederick K. Kirchner

It is hereby certified that error appears in the printed specification of the above numbered patent requiring correction and that the said Letters Patent should read as corrected below.

Column 1, line 58, under the formula, insert —I—; column 3, lines 19 and 20, for "lower-alkoxyl" read —lower-alkoxy—; column 5, line 18, for "ethyl-N'-" read — ethyl]-N'- —; line 37, for "N'-2-diethylaminoethyl)" read —N'-(2-diethylaminoethyl)—; line 62, for "2-Cl$_6$H$_4$CH$_2$Cl" read —2-ClC$_6$H$_4$CH$_2$Cl—; column 6, line 50, for "650" read —6.50—; column 7, line 18, for "N-[3-diethylamino)" read —N-[3-(diethylamino)—; column 8, line 46, for "ammonio)ethyl-N'-" read — ammonio)ethyl]-N'- —; column 9, line 37, for "ammonio)" read —diethylammonio)—; line 59, for "N-[2-benzyldiethyl-" read — N-[2-(benzyldiethyl- —; column 10, line 14, for "(C$_2$H$_5$)N" read —(C$_2$H$_5$)$_2$N—; line 52, for "N-[2-3,4-dichlorobenzyldiethyl-" read — N-[2-(3,4-dichlorobenzyldiethyl- —; column 12, line 52, for "N-[4-diethylallylammonio)" read —N-[4-(diethylallylammonio)—; line 55, for "N-[4-diethylamino)" read —N-[4-(diethylamino)—; line 68, for "N-[3-diisopropylamino)" read —N-[3-(diisopropylamino)—.

Signed and sealed this 7th day of April 1959.

[SEAL]

Attest:
KARL H. AXLINE,
Attesting Officer.

ROBERT C. WATSON,
Commissioner of Patents.

UNITED STATES PATENT OFFICE
CERTIFICATE OF CORRECTION

Patent No. 2,857,390                                  October 21, 1958

Frederick K. Kirchner

It is hereby certified that error appears in the above numbered patent requiring correction and that the said Letters Patent should read as corrected below.

Column 8, line 8, for "III, R'''" read -- I, R --.

Signed and sealed this 20th day of October 1964.

(SEAL)
Attest:

ERNEST W. SWIDER                                EDWARD J. BRENNER
Attesting Officer                                        Commissioner of Patents